Feb. 23, 1954
G. WUENSCH ET AL
2,669,875
LIQUID LEVEL METER
Filed May 15, 1952
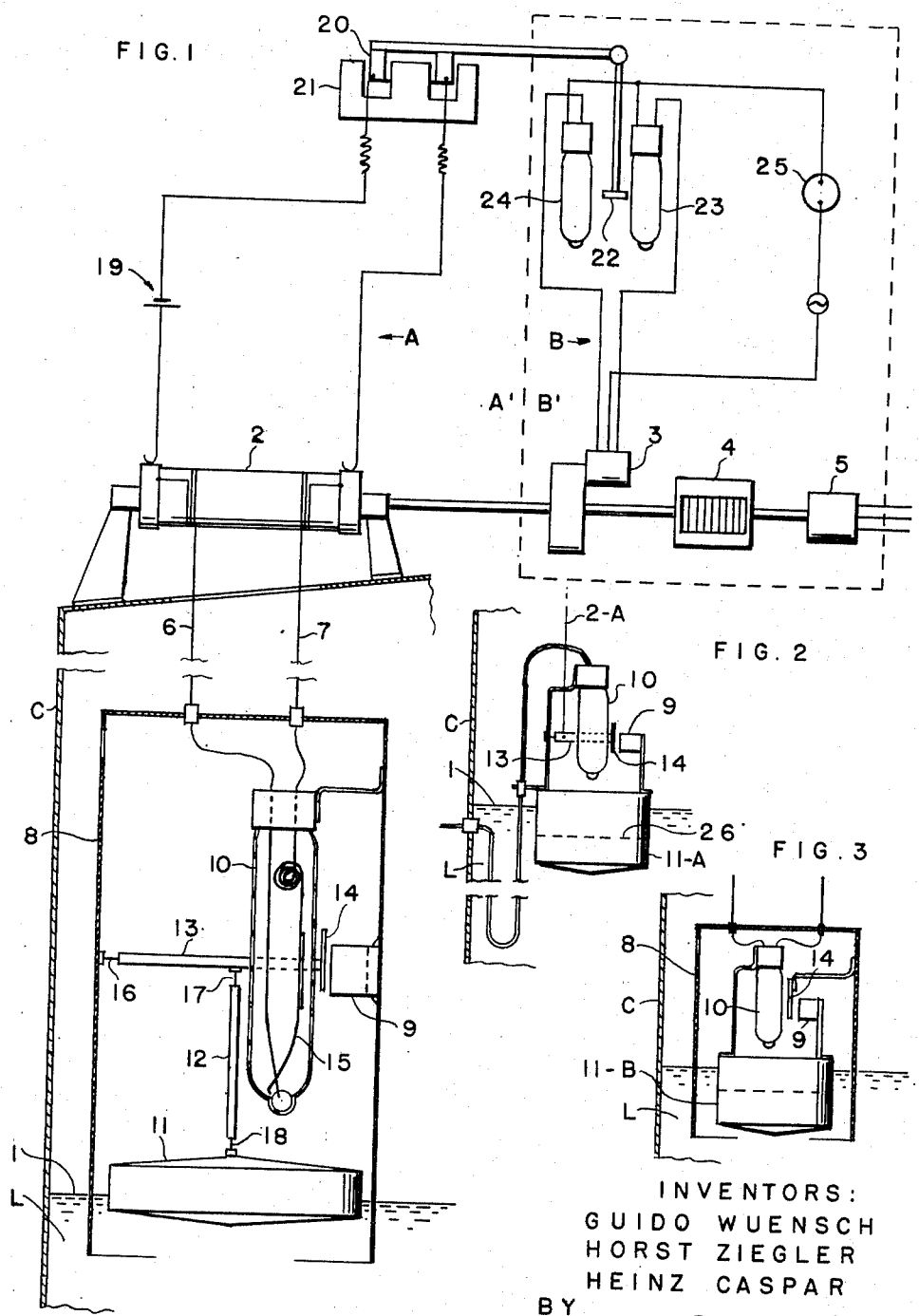
INVENTORS:
GUIDO WUENSCH
HORST ZIEGLER
HEINZ CASPAR
BY F. D. Prager
ATT'Y.

Patented Feb. 23, 1954

2,669,875

UNITED STATES PATENT OFFICE 2,669,875

LIQUID LEVEL METER

Guido Wuensch, Horst Ziegler, and Heinz Caspar, Berlin, Germany, assignors to Askania-Werke A.-G., a corporation of Germany Application May 15, 1952, Serial No. 287,828

4 Claims. (Cl. 73—313)

This invention relates to liquid level meters, including indicators, recorders, integrators, controllers and the like. The invention provides apparatus of this type with an extremely high degree of sensitivity and wide range of level variation. It facilitates the control of hunting and overriding tendencies. It allows accurate and practically reliable transmission of measurements, derived at a liquid level, to remote points; even in storage tanks filled with dangerous materials which cannot be exposed to the hazards of electric power circuits.

The invention utilizes a feeler-follower for a float. Devices of this kind have been used before. The improved device provides greater precision, among other things.

This is achieved mainly by a novel use of the known magnetic pole type mercury switch. The switch and its magnet are mounted in fixed relation to one another, on the float or float follower. Relative motion is produced between the switch and magnet on the one hand and a small shielding vane on the other. Preferably the lever carrying the shielding vane is also used to amplify the relative motion between the float and the feeler-follower.

The manner in which we have developed these principles will be understood more clearly from the description of some preferred embodiments, which follows. In the drawing, Figure 1, is a diagrammatic sectional elevation of one embodiment. Figures 2 and 3 are similar but fragmentary views, on a smaller scale, of modified embodiments.

Referring first to Figure 1:

The device serves to measure the level 1 of liquid L in a container C. The container may be a tank, or a gauge housing or pipe communicating therewith, or any other kind of structure. The device can be used whether the liquid level is the ultimate function to be determined or reflected, or whether this level is measured only for other purposes. The liquid level may either vary over considerable vertical distances, for instance over the entire depth of a storage tank, which often is about forty feet; or it may be substantially maintained at one end the same elevation by inlet and outlet control valves or the like for the container, which may be controlled by the present device.

At some suitable datum point, vertically spaced from the liquid level 1, as shown above this level, we install a pulley roll 2, mechanically actuated by a reversible motor reducer 3. This motor reducer also drives a measurement receiver such as the counter unit 4 to count integral and fractional revolutions of the roll 2, or an electric transmitter 5 to control remote instruments, not shown, in accordance with the operations of the pulley roll 2 and motor reducer 3.

Two juxtaposed suspension wires 6 and 7, which as shown are also used as electric conductors for a low-voltage current, are secured to the roll 2 and wrapped around the same in the same peripheral direction. The lower end portions of these wires support a mounting frame 8 in the container C. This frame rigidly holds a small permanent magnet 9 and a magnetic pole type switch 10 of the usual, hermetically sealed construction. The mounting frame is shown as a tubular body having an open bottom end which loosely surrounds and also protects a float 11. The float rests on the liquid level 1.

A magnetic pole type mercury switch requires extremely low amounts of energy, usually measurable in fractional inch grams, to definitely make and break low voltage, low amperage circuits. It is simple to mount, connect, and maintain in operative condition. The switch itself need not be moved to make and break the circuit. The movement of minute masses of magnetic material, adjacent the switch, suffices to make and break contact. An adequate magnet for such switches, as contemplated here, weighs only a minor fraction of an ounce. Some additional weight, often amounting to a few integral ounces, is required for mounting the magnet in operative relationship to the mercury switch.

In the new device as shown, a generally vertical link 12 is pivoted at its bottom end to the top of the float 11, and at its top end to an intermediate part of a generally horizontal lever 13. One end of this lever is pivoted to the inside of the tubular body 8. The free end of the lever has a flux shield or deflector vane 14 secured thereto. This vane plays in the air gap between the magnetic switch 10 and its magnet 9, substantially at right angles to the flux. The vane is substantially formed of a paramagnetic, magnetically soft substance, so that it is capable of shielding all or part of the flux from the armature and pole unit 15 of the switch 10. The entire control assembly 9, 10, 14 is mounted in and protected by the tubular body 8, above the float 11.

The pivots between the vane supporting lever and the mounting body 16 and at the upper and lower ends of the vertical link 17, 18 may have the form of flat springs, as shown. Such pivots are sufficiently accurate for present purposes, and they are particularly economical in construction and maintenance.

The linkage 12, 13, the positions of which are controlled by these pivots, has two important functions. In the first place it substantially fixes the horizontal distances between the magnet, the vane and the switch, by means of the generally horizontal arrangement of the lever 13. Second, it provides leverage, mechanically amplifying at the vane 14 the vertical travel which occurs at 11.

The mercury switch 10 forms part of a low voltage control circuit A, being in series with a source of current such as a small dry-cell battery 19 and with a movable coil 20 on the outside of the container C. The coil, when energized, is magnetically actuated—that is, attracted or repelled—by a magnet 21. The resulting movement is utilized mechanically to shift a relay magnet 22 which controls two relay switches 23, 24. These switches are shown, again, in the form of magnetic pole type mercury switches, although at this point, other constructions can be used with equal success if standardisation of electrical parts is disregarded. The switches 23, 24 control the forward or reverse operation of the motor 3. While diagrammatically shown as small units, these switches will often be larger than that shown at 10. The reversible motor circuit is generally designated by the letter B.

In the embodiment of Figure 1 as shown the float-controlled magnetic mercury switch 10 is open; the vane 14 is in shielding position; the coil 20 is deenergized and partly withdrawn from its magnet; the magnet 22 is positioned adjacent the switch 23 and closes this switch, while opening switch 24; the motor 3 rotates the pulley roll 2 in a right-hand direction as seen from the free end of the roll; and the roll slowly unwinds the wires 6, 7, gradually lowering the body 8. This body lowers the magnet 9 and switch 10 and brings them out of the shielding influence of the vane 14. After a short time at least part of the flux attracts the magnetic pole 15; this moment is accelerated by the fact that the leverage units 12, 13 raise the vane 14 while the body 8 drops (assuming that the float 11 remains stationary). When a certain part of the flux has become effective on the switch, the switch is closed. This energizes the circuit A and coil 20 and causes the coil to be repelled by the magnet 21. Thereupon the magnet 22 and the switches 23, 24 are reversed, reversing the rotation of the motor 3 and roll 2. The body 8 now begins to rise. It continues to do so until the shielding effect of the vane 14 is re-established, which is the case very shortly after the change from downward to upward travel; there being but a small difference between the energies required to make and break the mercury contact. As the magnet is shielded again the switch 10 and circuit A are opened, the coil 20 and magnet 22 are reversed again, and the downward movement of the body 8 is resumed.

Thus there is a continuous cycle of small, vertical oscillations of the magnet 9 relative to the vane 14 and as shown, specifically about the lower edge of this vane. This causes the entire follower-feeler assembly 8, 9, 10 to make periodic, small, vertical strokes about a zero position established by the float 11. This happens even in the absence of any change in the liquid level 1. Any rising of this level, and of the float 11, raises the zero point and is accordingly reflected in the operations of the motor 3 and units controlled thereby. The same thing applies to any falling of this level.

By means of a time switch 25 in circuit B the feeler motor 3 can be made operative and inoperative for periods of predetermined duration, thereby avoiding useless operations of the switches and conserving the energy of the dry cell battery.

It will be seen that the counter 4 shows the positive or negative difference between right-hand and left-hand rotations of the pulley roll 2. In case of "no change" in the elevation of the liquid level 1, the counter 4 exhibits "no change." In case of any sustained rising or falling of the liquid level 1, either at constant or at variable rates, the counter 4 shows both the cumulative change, generally by integral rotations of roll 2, and the precise momentary change, by fractional rotations of this roll. In case of frequent oscillations of the liquid level the response must be obtained, in known manner, from units (not shown) controlled by the electric responding device 5. The response can be used in known manner for indicating, recording, controlling and other purposes.

Attention is directed to the fact that the power circuit B is electrically independent from the low-voltage control circuit A and that moreover each circuit can be placed in a separate space and housing A', B'; no inductive or other similar coupling being required between them. Thus it is possible for instance to protect the control circuit A, and any surrounding explosive vapors or the like in container C, even in the event of a major mechanical accident, smashing the entire housing 8 and contents thereof, which could otherwise cause a momentary feedback of power current into the circuit A.

Further attention is directed to the fact that an extremely rapid and accurate response, with practically no "hunting" effects, is obtained from the control unit 8, 10, 14. The liquid L raises and lowers only an insignificant mass incorporated in the float 11, link 12, lever 13 and vane 14, thereby accelerating and decelerating rapidly and with little dynamic momentum. High sharpness as well as high accuracy of response can thus be obtained.

Of course the sharpness of the response at B, B' depends also on characteristics of the feeler system. This system, as shown in Figure 1, comprises greater masses than does the float; namely among other things the switch 10, the magnet 9 and mainly the mounting and protecting tube 8. If these masses were raised or lowered suddenly the supporting wires 6 and 7, which must be flexible, would be subject to some elastic strain. However the speed of the motor-reducer 3 can be so selected as to avoid any danger from this source.

By these expedients the system of Figure 1 is capable of obtaining liquid level measurements with increased accuracy, promptness, sharpness and safety, aside from economy. Heretofore tolerances of a few hundredths or thousandths of an inch were involved in the most accurate wide-range liquid level measuring systems; and the indicators tended to "hunt" upon any attempt at prompt transmission, even when larger tolerances were allowed. In some of these earlier systems, open, liquid-contacting electrodes were used to reduce dynamic mass effects and the like. Open electrodes are prohibitive in explosive surroundings and when used in other cases they do not provide very low measuring tolerances because of unavoidable physical variations of contact areas. Such variations are caused by small dirt particles on liquid surfaces, oxydation of electrodes, variation in liquid adhesion characteristics, and the like.

In each and all of these respects the new system is appreciably more efficient. We have found that this system easily allows wide-range liquid level measurements with tolerances of only a very few thousandths of an inch, or less. (It must be considered that a depth of $1/1000$ inch, in a tank of 200 foot diameter, represents a volume of almost 20 gallons, that is, an accounting item of definite value; mainly in the case of repeated liquid level variations and cumulated errors due to higher tolerance.) We have also found that such measurements can be made as sharp as may be desired. Even wave action at the liquid level can be measured without much distortion; a fact of definite importance, since storage containers are exposed to vibration due to wind, interior currents, and the like. It is also noteworthy that no hazardous instrumentation is involved, and that the new instruments are simple and inexpensive.

In some instances it is not desired to make the float response quite as sharp as it can be made according to Figure 1. On the other hand it may be desired either to reduce the masses incorporated in the follower-feeler system to faciltate rapid vertical oscillations thereof, or to leave these masses somewhat substantial to suppress errors due to air currents and the like.

For instance, in the modification of Figure 2 the float 11-A supports practically all of the instruments 9, 10 and their mounting means, and optionally some extra ballast 26. On the other hand the feeler-follower system here consists merely in the small vane 14 and an equally small and light lever 13, directly actuated from a motor 3 by a tension wire or band 2-A. The flexible conductors connected with the switch 10 in this case may hang freely in the liquid L.

In the modification of Figure 3 the switch 10 and its starter magnet 9 again are mounted on the float as in Figure 2 and the control vane is mounted in a protecting tube 8 somewhat as in Figure 1, but with a rigid connection between the tube and the vane.

It will be noted that the improved liquid level measuring apparatus, shown and described herein, can be modified in various ways and the principal advantages claimed for the new idea can still be preserved. We do not wish to be limited to the exact details as described and illustrated, but claim our invention as follows:

1. Apparatus for measurement of a widely varying liquid level, comprising a float device adapted to ride on the liquid level to be measured; a float follower device; a magnetic pole mercury switch and a control magnet for the same, both rigidly mounted on one of said devices; a small and light shield, supported at least in part by the other of said devices, readily insertable between and removable from between the magnet and switch by small vertical movements of one of said devices relative to the other; a low voltage circuit including said switch; a power circuit controlled by said low voltage circuit; power means in said power circuit adapted alternately to lower and raise said float follower device depending upon the insertion or removal of the shield between the magnet and switch and thereby to keep the float follower device closely adjacent the elevation of the float device while constantly maintaining small upward and downward movements of the float follower device; and measuring means adapted to operate together with the power means and thereby to reflect differentials between the upward and downward motions of the float follower device and indirectly to reflect the upward or downward motions of the float device and liquid level.

2. Apparatus according to claim 1 wherein the float follower device comprises a tubular body surrounding the float device and protecting the switch, magnet and shield.

3. Apparatus according to claim 2 wherein the shield is directly supported by one end portion of a lever which is pivoted at its other end portion to one of said devices and also pivoted in an intermediate portion to the other of said devices in order to amplify the relative movement between said devices and to restrain horizontal motion of the shield relative to the switch and magnet regardless of horizontal motion between the float and float follower devices.

4. Apparatus according to claim 3 wherein the float device is light and small and is pivoted to the intermediate portion of the lever supporting the light and small shield; the switch and magnet being supported by the float follower device, raised and lowered by said power means.

GUIDO WUENSCH.
HORST ZIEGLER.
HEINZ CASPAR.

References Cited in the file of this patent

UNITED STATES PATENTS

| Number | Name | Date |
|---|---|---|
| 1,695,701 | Steiner | Dec. 18, 1928 |
| 2,189,597 | Wells | Feb. 6, 1940 |
| 2,307,304 | Rudd | Jan. 5, 1943 |
| 2,335,943 | Jones | Dec. 7, 1943 |
| 2,363,174 | Green | Nov. 21, 1944 |
| 2,487,310 | Chandler | Nov. 8, 1949 |

FOREIGN PATENTS

| Number | Country | Date |
|---|---|---|
| 1,107 | Great Britain | Jan. 15, 1904 |
| 626,418 | Great Britain | July 14, 1949 |